Patented Jan. 1, 1924.

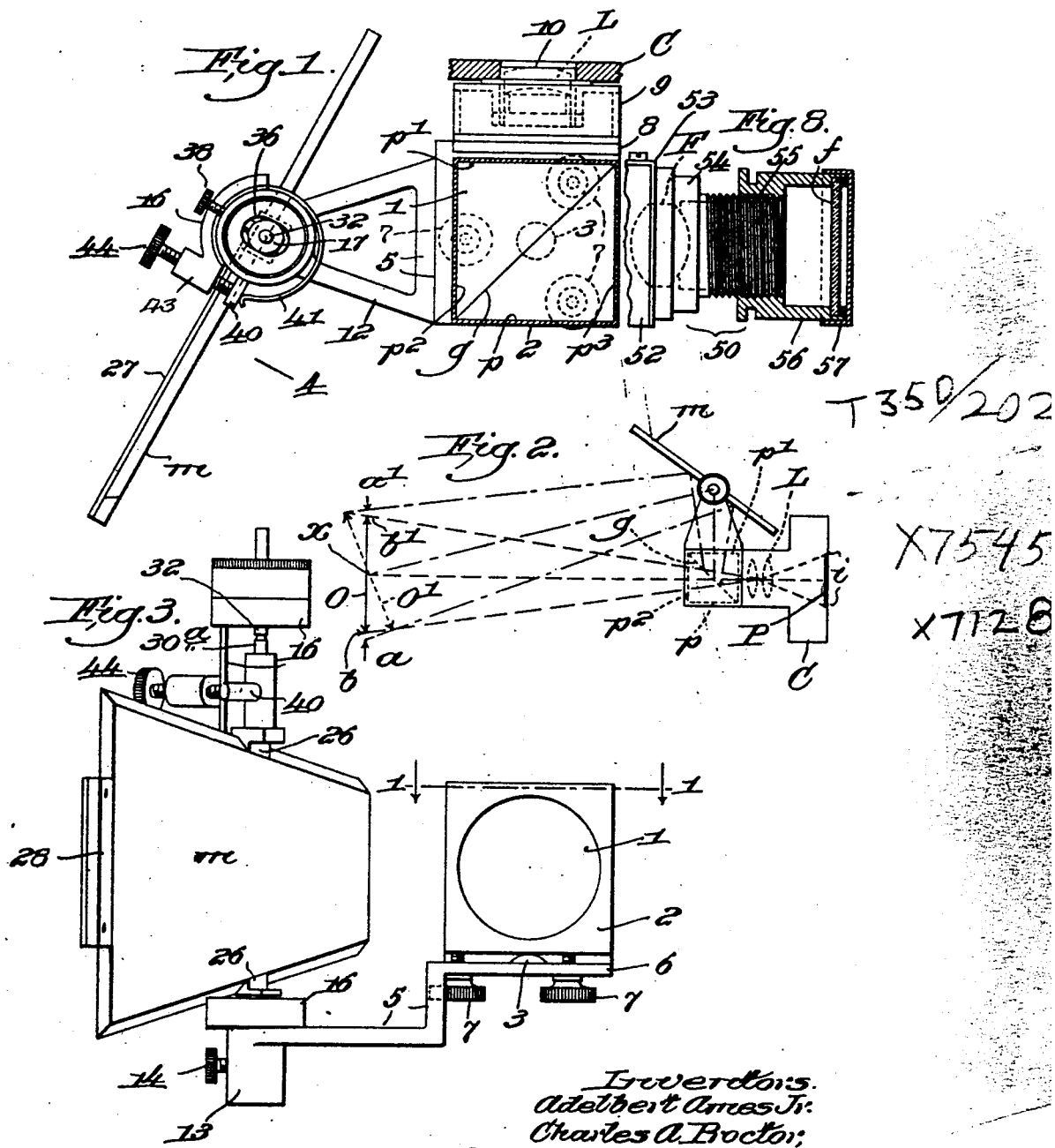
Jan. 1, 1924
A. AMES, JR., ET AL
1,479,211
CAMERA APPARATUS FOR BINOCULAR PHOTOGRAPHY
Filed June 2, 1921   2 Sheets—Sheet 1

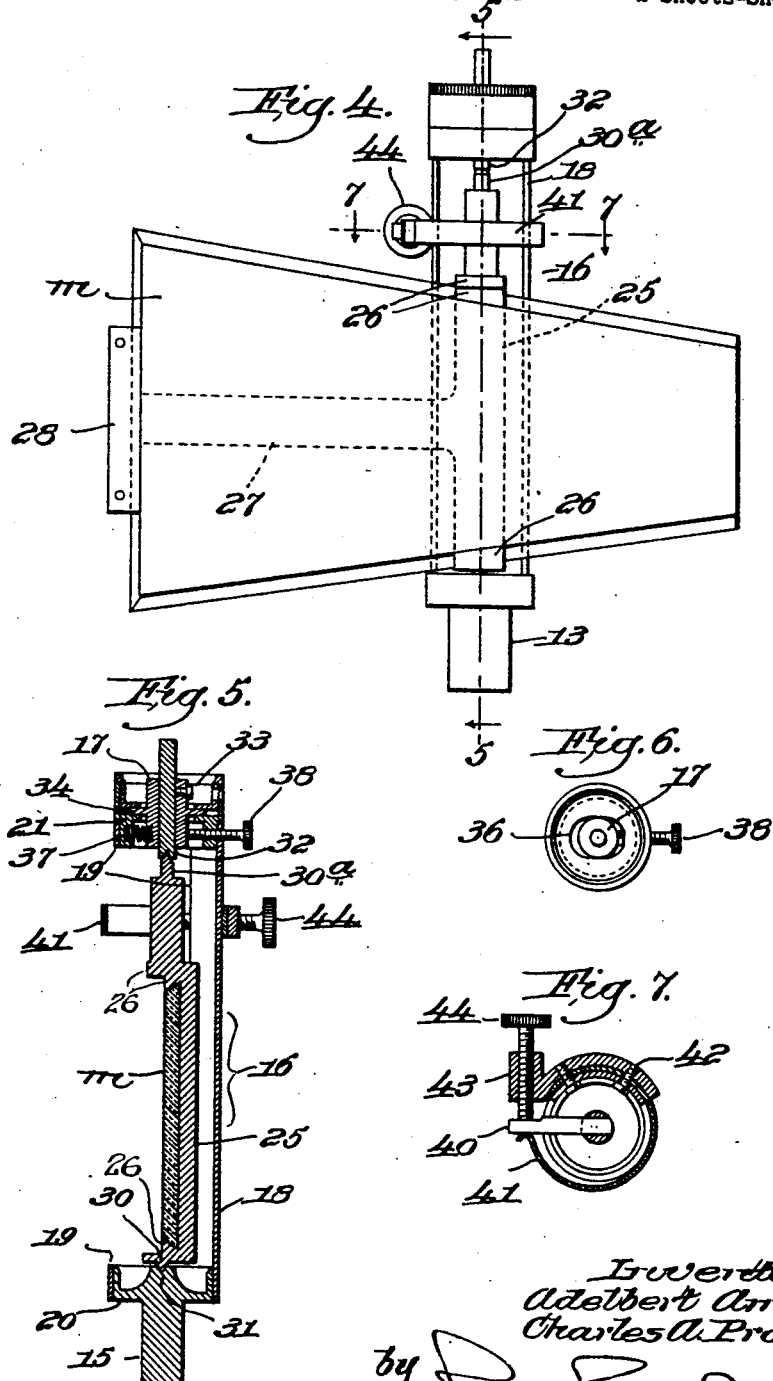

1,479,211

UNITED STATES PATENT OFFICE.

ADELBERT AMES, JR., AND CHARLES A. PROCTOR, OF HANOVER, NEW HAMPSHIRE.

CAMERA APPARATUS FOR BINOCULAR PHOTOGRAPHY.

Application filed June 2, 1921. Serial No. 474,560.

*To all whom it may concern:*

Be it known that we, ADELBERT AMES, Jr., and CHARLES A. PROCTOR, citizens of the United States of America, and residents of Hanover, in the county of Grafton and State of New Hampshire, have invented new and useful Improvements in Camera Apparatus for Binocular Photography, of which the following is a specification.

This invention relates to photographic apparatus.

It has long been regarded as a desirable object to provide for creating the illusion of stereoscopic vision in perception of the photographic picture, projection of print which is the ultimate object of photography. The ancient way of doing this is to prepare a simultaneous pair or couple of pictures taken by separate lenses in virtually separate cameras at the same time, the axes of the lenses being laterally separated at least by the normal distance between the axes of vision of the human eyes, and generally exceeding this separation. Such stereoscopic couples of images as are formed by this expedient make separate pictures of the object field respectively similar to the point of view of each of a pair of normal human eyes. In order to view these pictures in superposition so as to obtain the illusions of solidity, perspective, and distance of the objects in the picture, the common prior expedient comprised a viewing instrument, generally having divided prismatic lenses, one for each eye of the observer, and a rack for mounted prints of the stereoscopic couple. When viewed through the instrument, sensory accommodation superposes the pictures into one impression, the right eye receiving the sensory impressions of the right-hand picture of the couple and the left eye receiving the sensory impressions of the left-hand picture of the couple.

The projection of such pictures on a screen for entertainment or instruction simultaneously of a number of persons was never practicable under these arrangements; the apparatus was cumbersome; the duplication of negative and print was objectionable on account of its cost and the difficulty of producing accurately related pictures; and such stereoscopic pictures and stereoscopes enjoyed no better vogue than that of a scientific toy of wide distribution and amusing interest but of very little practical value.

Pictures made by such cameras contained no provision for emphasizing by better definition any particular part of the object-field, or for utilizing the inherent aberrations of the optical parts of the instruments to improve the sensory, perceptive or objective effect of the pictures. We are aware that numerous attempts have been made to obtain the stereoscopic effect without the inherent difficulties, complexities and expense of the simultaneous couples of separate pictures, which attempts may be epitomized as those comprising a division of the picture space into numerous integral units, having the units of the image from one point of view interpolated between the units of the image of the other point of view; those comprising kinematrographic devices in which the overlapping couples are displayed alternately in succession; and those comprising attempts to merge the simultaneous images from separate points of view into one composite simultaneous image.

The present invention relates to apparatus for making the product and practicing the method of the application for Letters Patent filed by Adelbert Ames, jr., on or about March 14, 1921, Ser. No. 452,273.

A principal object of the present invention is to provide apparatus making feasible the making of stereoscopic pictures by taking photographs of a simultaneous superposition of images of the same object-field as viewed from laterally separated points of view, for the purpose of obtaining a stereoscopic effect in the single resultant image, or in a region of the image comprising the center of interest. Further objects of the invention are to provide a way of making two images with the same lens, each using the full aperture of the lens; to provide means adapted to be attached to cameras of familiar construction and ordinary use for the purpose of converting them into instruments capable of taking stereoscopic pictures of the kind referred to; to avoid increasing, for these purposes, the often short distances separating the nodal point of the lens from its image plane; and to provide apparatus for these purposes which shall be accurate, convenient, portable and adapted to convenient adjustment without complexity of construction.

We shall now explain the invention in connection with illustration of a specific form of the device, as one instance only of the genus of apparatus constituting the invention.

In the accompanying drawings,

Fig. 1 is a plan view partly in horizontal section on line 1—1 of Fig. 3 of an attachment for a camera of any usual construction and adapted for the purposes of the invention;

Fig. 2 is a diagram in plan illustrating the optical effect of the apparatus;

Fig. 3 is a front elevation of the devices shown in Fig. 1;

Fig. 4 is an elevation in the direction of the arrow 4, Fig. 1;

Fig. 5 is a section on the line 5—5 of Fig. 4;

Fig. 6 is a detail plan of some of the devices shown in Fig. 5;

Fig. 7 is a plan in section on the line 7—7 of Fig. 4; and

Fig. 8 is a plan partly in horizontal section of a finder attachment optionally employed.

Referring now to Fig. 2, an ordinary camera C has the usual photographic lens L arranged to form an image on the sensitive surface P, which simultaneously is provided to receive and be exposed to overlapped and registered images formed by the lens L from different and laterally separated points of view. In the preferred form illustrated this is accomplished by a provision of an optical system having means for causing different divergent bundles of rays of light from one point of the object O simultaneously to enter the lens in the same direction, one of these bundles of rays representing a direct view or aspect of the object and the other an indirect view or aspect of the object formed by reflection or refraction, preferably by reflection from plane surfaces, of which the nearest surface to the object is displaced laterally from the nearest surface to the lens by at least the distance separating the eyes of the normal observer.

A photograph made under these circumstances will be sharp or distinct in respect to only so much of the object as is of like geometrical figure in projection at the respective points of view, and there will be in the picture confusion of the image of the object in one aspect (i. e., from one point of view) with the image in another aspect (i. e., from another point of view). But these simultaneous images, as an effect to be attained by the apparatus, are images equivalently formed by the image forming lens L so far as symmetry with respect to its axis, and the aberrations of the lens, and the projection on the plate P are concerned: the central rays of both bundles of rays of light emitted from the center of interest enter the lens along both paths in a parallel state, and coincident with the axis of the lens. Under these circumstances the superposition of images from the different points of view by the apparatus results in a solidity and distinctness of the composite image of objects simultaneously apperceived by the respective optical elements of high value as a quality of the single photograph or image formed by the lens L.

The preferred way of obtaining a duplication of the light from the object-field for the purpose of making the two simultaneous images is indicated in the diagram, Fig. 2, and may comprise in general a primary reflector, such as a plane mirror $m$ preferably adjustable about a vertical axis and having its mean center displaced at one side of the axis of the lens L, in front of which lens a partly reflecting and partly transmitting surface $g$ is placed at an angle of 45°, more or less. The surface $g$ may be a half-silvered or platinized coat on one of the plane meeting faces of two 45° prisms constituting a prism block 1, whose third angles are each 90°, the prisms being conjoined at the diagonal surfaces $g$ by an optical cement of an index of refraction comparable to the glass of the prisms, the whole constituting a cubical block of which at least the optical surfaces $p$, $p'$ and $p^2$, and preferably $p^3$, are flats. One of the images on the plate P will thus be formed by direct transmission through the prism block 1. The other image superposed on the plate P is a double reflection from the surface $g$ and the surface of the mirror $m$. The light-gathering power of the system is that of the bare lens L, minus only the transmission losses of the prism-block 1, and reflection loss at the mirror, which amount to about 20% only.

It will be apparent that for any given adjustment of the mirror $m$ there is only one vertical region in the object-field of which the images will be strictly coincident on the plate P. This, for instance, is the vertical represented by the point $x$ in Fig. 2. An object O of any magnitude in the line of the axis of lens L is thus viewed through the different systems O, $m$, $g$, P and O, $g$, P from different angles, as measured by the parallax of the distance separating the mirror $m$ and the surface $g$ concerned in the production of the reflected component of the image. The nearer the object approaches the camera the greater will be the diversity in size and geometrical form of the two images. This will be understood by comparing the object-field distance $a$, $a'$, represented by the margins of the image $i$ in the reflected image, with the object-field distance $b$, $b'$, represented by the same dimension of the image $i$ in the direct path. The difference between the quantity $a$, $a'$ and the quantity $b$, $b'$ increases as the object in question is brought nearer the camera. There is, however, a vertical plane of the object-field images of which have lateral margins in coincidence at P, which plane is represented on the diagram by the dotted arrow O'. This plane of consonance is not at a right angle to the optical axis of the camera, for reasons which will be apparent from study of the diagram. Everything in the picture out of this plane will partake to a greater or less degree in an orderly diffusion due to failure of coincidence of the respective images.

A photograph made by apparatus generally responding to Fig. 2 will be characterized by a well-marked solidity, with diffuse definition and relief or perspective in the whole field, but a part of the field represented by and near the vertical line $x$ on the diagram, of which the images are closely coincident, and in respect to which the aberrations of the system are at a minimum, will be in intense relief and sharply defined. Photographs of high artistic merit having a distinct stereoscopic quality because they are composites of images from two points of view may thus be produced, the confusion of the field except at the crossing region near $x$ of the central beams of the reflected and direct images lending merit, rather than obscurity, to photographs of objects which have a natural center of interest, when that center of interest is brought into the region of good definition near points in the line $x$.

When photographs made according to this principle are made by a lens L not too well corrected with respect to the margins of its field, the effect of concentration of interest and stereoscopic relief is further enhanced, and the device of this application is particularly but not exclusively intended to be used under circumstances in which these characteristics are of value. Motion pictures of dramatic interest, in which concentration upon one character or object is intended, are particular instances of the kind of photographs which may be enhanced in illusion and interest by use of this apparatus.

It is important that adjustments of the apparatus should be quickly and easily made and certainly retained.

A preferred form of the device comprises a box 2 for the prism block 1 resting on a boss 3 of a mounting 5 having a horizontal portion 6 through holes in which three hold-down and adjustment screws 7 take into tapped holes in the box 2, the plate 5 having an apertured upright 8 bearing an attachment member 9 adapted to be fastened, as by screw-threads or otherwise, to the mounting 10 for the lens L. From one side of the mount 5 an arm 12 projects a sufficient distance for the position of the vertical center of rotation of the mirror $m$, and there terminates in a vertically bored socket 13 having a set screw 14 and adapted to receive the lower end 15 of the mirror mounting 16, which comprises in general a yoke terminating at one end in the pintle 15 and having at the other end a bearing member 17. The preferred construction best shown in Figs. 4, 5 and 7 comprises a tubular part 18 cut away at 19 and fastened to an enlargement 20 integral with the pintle member 15, and at the other end to a diametrically slotted diaphragm or block 21.

The cut-away portion 19 in the yoke member 16 is sufficiently deep to allow the play in the yoke member of a mirror-support 25 preferably having overhanging lugs 26 axially placed thereon and an arm 27 having a gib 28 taking over the end bevel of the beveled plane glass mirror $m$. The mirror $m$ is silvered or platinized on its surface.

The mirror support 25 is arranged to rotate in respect to the yoke 16 and to have a slight motion about its lower axial point of support in a lateral sense.

Referring to Fig. 5, the frame 25 terminates at one end in a bearing cone 30 taking into an axial depression 31 of the pintle 15, and at its top end is provided with a similar bearing cone 30$^a$ taking into a bearing in the bottom of an axially adjustable bearing stud 32 fastened by the set screw 33 in the movable bearing 17. This bearing 17 is made with a central flange 34 which rests upon the diaphragm 21 which is slotted diametrically at 36 to permit lateral play of the bearing block 17. This lateral play is regulated by a spring 37 opposing an adjustment screw 38. Motion of the screw 38 shifts the turning axis of the mirror mounting 25, slightly. This is hereinafter referred to as an adjustment for altitude.

The mirror $m$ may be adjusted in azimuth merely by rotating the yoke 16 and pintle 15 in the socket 13, and when so adjusted is then adapted to have a fine adjustment to bring particular parts of the object field into coincidence as viewed directly through the prism block 1 and indirectly by reflection. The mirror frame 25 is provided with an arm 40 encircled by a leaf spring 41 attached to the yoke 16, as at 42. Yoke 16 bears a bored and threaded lug 43 for the adjustment screw 44 taking against the arm 40. When the yoke 16 has been roughly fixed in its azimuth adjustment, motion of screw 44 sweeps the mirror $m$ preferably through the whole of the slight angle of deviation represented by the one-half of the angle between the direction of an object in the optical axis of the lens at an infinite distance, and close up to the camera, respectively.

It will be observed that the heads of the adjustment screws 38, 44 are convenient to an operator standing behind the camera. Adjustment should be provided for the position of the line joining the centers of the reflecting system, so that this line shall be horizontal. This is afforded by turning the whole mounting 5 on the lens mounting 10.

In operation adjustment of the screw 7 is effected to bring the plane surfaces of the block 1 nearly perpendicularly to the axis of the lens. The mirror $m$ is thus adjusted to bring the direct and the reflected image from the surfaces $m$, $g$, into coincidence at the center of interest. The camera is then used for photography of motion or still pictures, as usual.

Referring now to Fig. 8, the optical arrangements above described do not utilize the direct beam reflected from surface $g$, or the transmitted beam reflected from mirror $m$, the utilized light consisting of the transmitted direct beam, and the twice-reflected beam from mirror $m$. The disused light is available toward the right of Fig. 2 to form another image exactly like the image in camera C, so far as registering of its components is concerned. We have herein shown a bright view finder 50 comprising a lens F and translucent or transparent screen $f$ in the focal plane of lens F adapted to be attached to the prism box 2. Preferably this box is apertured at its right face and extended at 52, and carries a bracket 53 including a mounting 54 for lens F having a threaded extension 55 upon which a mounting 56 for screen is screwed, and adjustable for focusing or relation of marks on the screen $f$ to the field of view. The finder may be closed by a cap 57. The particular mounting shown for the optical parts of the finder is preferred, among other reasons, because it is an effective counterbalance for the mirror $m$ and its mounting.

What we claim is:

1. Photographic apparatus having therein an image-forming lens, and an optical system comprising means for causing a plurality of mutually divergent rays of light emitted from the same point in the object-field to enter the lens simultaneously in parallel relation.

2. Photographic apparatus having therein an image-forming lens, and an optical system comprising means for causing a plurality of mutually divergent rays of light emitted from the same point in the object-field to enter the lens simultaneously in parallel relation and in coincidence.

3. Photographic apparatus having therein an image-forming lens, and an optical system comprising means for causing a plurality of mutually divergent rays of light emitted from the same point in the object-field to enter the lens simultaneously in parallel relation and in coincidence with each other and with the optical axis of the lens.

4. Photographic apparatus having therein an image-forming lens, and an optical system comprising means for causing a plurality of mutually divergent bundles of rays of light emitted from the same point in the object-field to enter the lens simultaneously, other rays of said bundles severally diverging from a central ray thereof parallel with the axis of the lens.

5. Photographic apparatus having therein an image-forming lens, and means for simultaneously forming thereby a direct and a reflected image of the same object in divergent beams of light entering the lens throughout its aperture, and divergent severally in respect to axial rays coincident with each other and with the axis of the lens, whereby the images are coincident at a center of interest, and differ from each other in respect to the view-points of the lens and of the primary reflecting means.

6. Photographic apparatus comprising a lens, and means between the lens and the object for transmitting light emitted in one direction from the object to the lens, and for reflecting light emitted from the object in another direction into the lens, said means comprising a light transmitting and reflecting surface interposed between the full aperture of the lens and the paths of the several beams thereto.

7. Photographic apparatus comprising a lens, and means between the lens and the object for transmitting light emitted in one direction from the object to the lens, and for reflecting light emitted from the object in another direction into the lens, said means comprising a light transmitting and reflecting surface interposed between the full aperture of the lens and the paths of the several beams thereto, and a primary reflector laterally spaced therefrom.

8. Photographic apparatus having therein a lens, a light transmitting and reflecting surface in and inclined to the axis of the lens, and a primary reflector spaced from said transmitting and reflecting surface, in combination with means for adjusting the system to cause coincidence between the transmitted and the reflected light entering the lens from a point in the object-field.

9. Photographic apparatus having therein a lens, a prism group including a light transmitting and reflecting surface in and inclined to the axis of the lens having entrance surfaces disposed at an angle, and a primary plane reflector spaced from said transmitting and reflecting surface in a direction normal to one of said entrance surfaces, in combination with means for adjusting the system to cause coincidence between the transmitted and the reflected light entering the lens from a point in the object-field.

10. Photographic apparatus having therein a lens, a light transmitting and reflecting surface in and inclined to the axis of the lens, and a primary reflector spaced from said transmitting and reflecting surface, in combination with means for adjusting the primary reflector to vary the point in the object-field and in the axis of the lens from which axial rays are coincident in the image.

11. In a camera, a lens, in combination with means adapted to be attached in front of the lens for bringing into coincidence throughout the aperture of the lens and in its image light emitted in two distinct divergent directions from a point in the object-field.

12. In a camera, a lens, in combination with means adapted to be attached in front of the lens for bringing into coincidence throughout the aperture of the lens and in its image light emitted in two distinct divergent directions from a point in the object-field, and means for adjusting a part of the said means to select points at different distances from the lens in respect to which such coincidence occurs.

13. In a camera, a lens, in combination with means in front of the lens comprising a primary reflector and an inclined reflector adapted to transmit light incident thereon, the inclined reflector intervening between the object-field and the full aperture of the lens, in combination with means for adjusting the primary reflector in two dimensions to bring the transmitted and the reflected beam into directional coincidence along the axis of the lens.

14. A camera having therein an optical system comprising a photographic lens, a primary reflector laterally displaced from the axis of the lens, means in the axis of the lens for transmitting light incident upon the lens in the direction of its axis, said means being adapted to reflect into the lens in the same direction light reflected from the primary reflector, in combination with means for adjusting the primary reflector in altitude and in azimuth.

15. A camera having therein an optical system comprising a photographic lens, a primary reflector laterally displaced from the axis of the lens, means in the axis of the lens for transmitting light incident upon the lens in the direction of its axis, said means being adapted to reflect into the lens in the same direction, light reflected from the primary reflector, in combination with a finder lens coaxial with the direction between the primary reflector and the said means for transmitting and reflecting light, whereby light incident upon said apparatus in one direction is reflected into the finder and transmitted into the first mentioned lens and light incident upon the apparatus in another direction is transmitted into the finder and reflected into the first mentioned lens.

16. In a camera, the combination of a lens, means between the lens and the object for transmitting light emitted in one direction from the object to the lens, and means for reflecting light emitted from the object in another direction into the lens, said means comprising a light transmitting and reflecting surface interposed between the full aperture of the lens and the paths of the several beams thereto, a primary reflector laterally spaced therefrom, and a finder lens coaxial with the path between said light transmitting and reflecting surface and said primary reflector.

17. In a camera, in combination with a photographic lens, means for transmitting and for reflecting light between the lens and its object-field, a primary reflector on one side of said transmitting and reflecting means, and a finder lens on the other side thereof.

18. In a camera, means for forming composite images by coincident formation of a direct and a reflected image comprising in combination means for transmitting and for reflecting the beams of light in respect to which the images are formed, and means for adjusting the path of one component of the image-forming light in said optical system to determine different intersections of the respective optical paths in the object-field, whereby to determine accurate coincidence of the images in respect to different points of the object-field.

19. In a camera, an optical system adapted to be placed between the camera and the object to be photographed for the purpose of forming a composite image from a plurality of points of view comprising a compound prism having parallel entrance and emergent faces, an entrance face at right angles thereto, an inclined surface adapted to reflect and to transmit light and means for supporting and adjusting a plane mirror at a point laterally displaced from said last-mentioned entrance surface.

20. In a camera, an optical system adapted to be placed between the camera and the object to be photographed for the purpose of forming a composite image from a plurality of points of view comprising a compound prism having parallel entrance and emergent faces, an entrance face at right angles thereto, an inclined surface adapted to reflect and to transmit light and an image forming finder lens and focal plane screen mounted behind an emergent face of said prism opposite to said last mentioned entrance surface.

Signed by us at Hanover, New Hampshire, this 26 day of May, 1921.

ADELBERT AMES, Jr.
CHAS. A. PROCTOR.